F. E. NORTON.
VARIABLE SPRING FOR GOVERNORS.
APPLICATION FILED MAR. 31, 1913.
1,096,386.
Patented May 12, 1914.
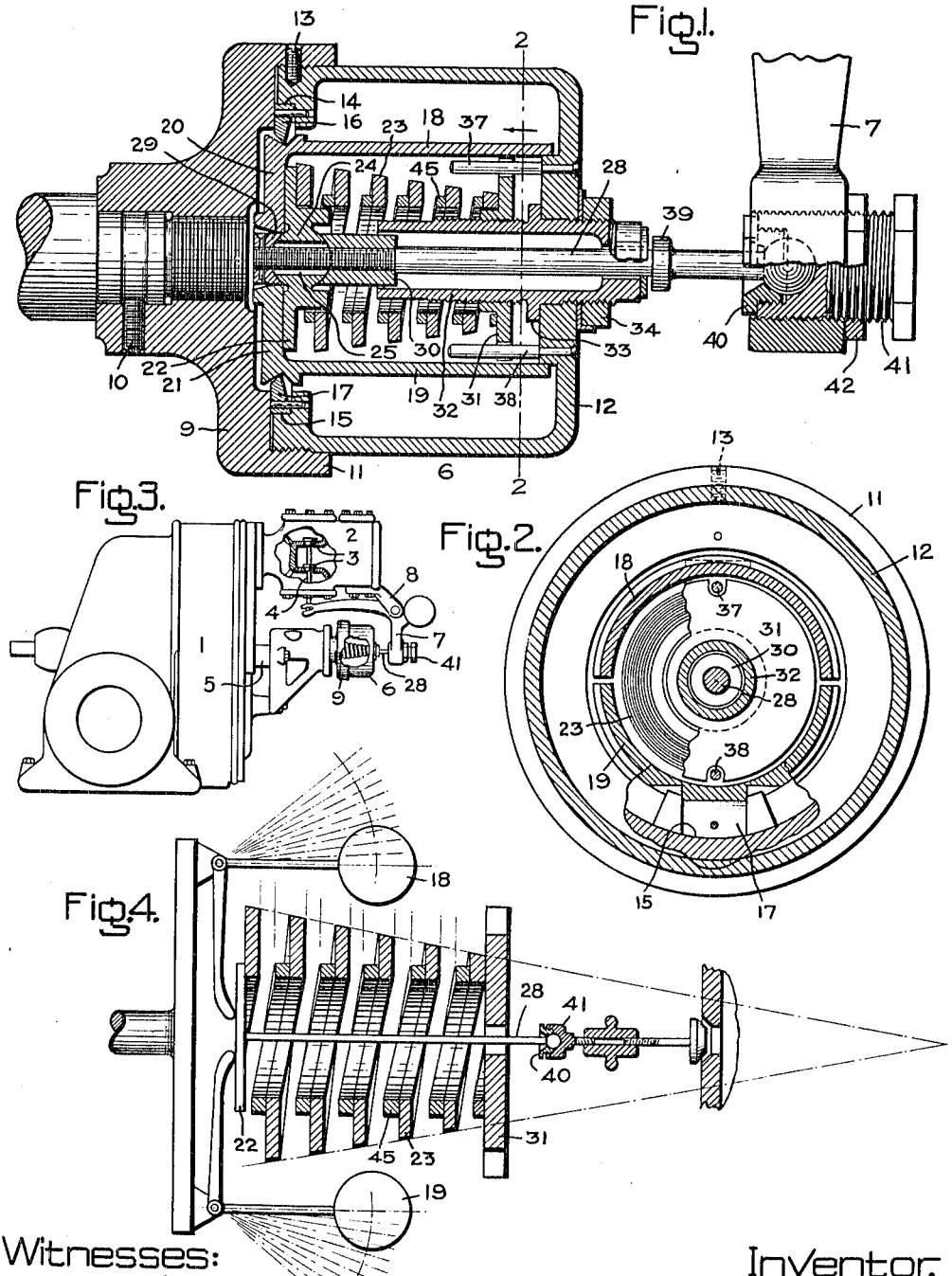
Witnesses:
Marcus L. Byng.
J. Ellis Glenn.
Inventor,
Fred E. Norton
by Albert G. Davis
Att'y

UNITED STATES PATENT OFFICE.

FRED E. NORTON, OF LYNN, MASSACHUSETTS, ASSIGNOR TO GENERAL ELECTRIC COMPANY, A CORPORATION OF NEW YORK.

VARIABLE SPRING FOR GOVERNORS.

1,096,386.  Specification of Letters Patent.  Patented May 12, 1914.

Application filed March 31, 1913. Serial No. 757,808.

*To all whom it may concern:*

Be it known that I, FRED E. NORTON, a citizen of the United States, residing at Lynn, county of Essex, State of Massachusetts, have invented certain new and useful Improvements in Variable Springs for Governors, of which the following is a specification.

The present invention relates to variable springs for governors suitable for elastic fluid turbines and other motors working under similar conditions and has for its object to provide a spring which is adjustable for widely different speeds of the turbine or motor.

In carrying out the invention a spring is provided which is mounted on the revolving part of a turbine or other motor, or in such relation to it that the spring will be deflected according to the speed of rotation of said revolving part, thereby communicating movement to a valve for controlling the admission of elastic fluid to the turbine, or to any suitable device for regulating the speed of the machine according to the load.

To meet the variable conditions, the spring requires an approximately conical outline or a formation which permits a variation in the diameter of the convolutions of the said spring, and also a variation in the cross sectional area of each convolution. By this construction the largest convolution is the strongest, due to the large cross sectional area, whereas, the smallest convolution is the weakest, due to the small sectional area, and any pressure exerted axially on the spring will cause the weakest convolution to deflect or yield first and the other convolution in turn according to pressure exerted and to the rotative speed for which the spring is adjusted. That is to say, if the smallest convolution is designed to deflect at a minimum pressure exerted by a centrifugally acting weight, the largest convolution will deflect at the maximum pressure. Springs of this character are very desirable in a governor, due to the fact that the latter can be easily adjusted to give widely different speeds for the motors, which motors are used to drive pumps or compressors where different conditions, or pressures, are required within wide ranges which would be impossible to obtain with a governor spring having convolutions of the same diameter and cross sectional area, the latter permitting a regulation of one speed only. In such latter arrangement the machine tends to race at light loads, or is incapable of operating efficiently at overload which reduces the effective use of the machine. Whereas in my structure when the weights or revolving elements are thrown outwardly by centrifugal force they exert a pressure on the spring as a whole, and as the pressure increases the first convolution deflects and direct pressure is exerted against the next convolution, and so on, until the pressure reaches the necessary value to cause the valve to close, thereby slowing down the machine. On a decrease in speed the opposite takes place. The large convolutions are designed to take care of the maximum pressure or load exerted by the weights.

To obtain the proper successive amount of travel for each convolution of the spring, a spacing spring made of soft or any suitable metal is placed between the said convolution, and when one of them is deflected it travels until the spacing member acts against the next convolution to which the movement is communicated and so on with each convolution in turn. The spacing spring is especially desirable because it thereby becomes possible to obtain the desired amount of travel between convolutions.

The spring is suitably mounted on members which are secured to a driving shaft. An adjusting device is provided for the initial setting of the spring for lower speeds, that is, if the spring is designed for a range of adjustment in speed variation of the motor from one thousand to two thousand revolutions per minute, the spring will be adjusted to one thousand revolutions per minute. Working in conjunction with the above mentioned adjusting device is another adjusting device for obtaining a variation of adjustment from one thousand to two thousand revolutions per minute of the motor. This is accomplished by means of an adjusting device which alters the relative position of the valve and the seat and allows the weights to force the convolution of the spring together as higher speeds are desired. In other words, my arrangement is distinguished from the ordinary speed governor in that the compression pressure exerted on the spring is not transmitted through the adjusting device, said pressure in governors of this kind often being as high as 500 lbs. In my improved device the force transmitted is only that required to move the valve and its stem.

In the accompanying drawing which illustrates one of the embodiments of my invention: Figure 1 is a longitudinal section of a governor; Fig. 2 is a cross-section taken on the line 2—2 of Fig. 1; Fig. 3 is a small view of steam turbine fitted with my improved governor; and Fig. 4 is a diagrammatic view of the spring and associated parts.

1 indicates a turbine casing and 2 a steam chest secured thereto by means of bolts and containing a balanced valve 3 having a stem 4. A passage extends from the valve casing to the nozzle and bucket wheels through which elastic fluid passes to drive the turbine rotor (not shown). The rotor is mounted on the shaft 5, the latter having suitable bearings at opposite ends. Secured to one extremity of the shaft is a speed responsive device 6, the spindle of which is connected to a bell crank 7, pivotally secured to the bracket 8. This device controls the valve 3 through the spindle, bell crank, lever and the valve stem.

Referring to Figs. 1 and 2, which represent the preferred construction of my speed responsive device, 5 indicates the shaft having a shouldered screw threaded end, upon which is mounted the hub of the governor base 9, the latter being rigidly held in position by the set screw 10 seated in a depression in the shaft. Cast with the base 9 is an annular flange 11 which is threaded internally to receive the cover 12, said cover being held in position by means of the set screws 13. Cast on the cover 12 are two inwardly extending projections having shoulders 14 and 15 adapted to receive the knife edges 16 and 17 which enter V-shaped seats formed in the weights 18 and 19.

The weights are semi-circular in form and are fulcrumed on the knife edges 16 and 17. As the speed of the shaft 5 increases the outer ends of the weights are moved outwardly due to centrifugal force; or, if the speed of the shaft 5 decreases the weights will move in the opposite direction. Cast with the weights are inwardly extending arms 20 and 21 which form bell crank levers that are fulcrumed on the knife edges mentioned above. Any outward movement of the weights 18 and 19 will be communicated to the movable abutment 22 by the members 20 and 21. If the speed of the shaft 5 decreases the weights are forced back by means of the spring 23. Cast with movable abutment 22 is a ball 24 having a hole 25 drilled therein. Extending through the hole is a spindle 28 which is movably secured to the ball 24 by the nuts 29 and 30 which are threaded on said spindle, the former being held or fixed in a position by a rivet. The nuts 29 and 30 and ball 24 retain the spindle 28 in axial alinement, and any unequal angular movements of the arms 20 and 21 of the weights against the movable abutment 22 will be absorbed by allowing the abutment 22, of which the ball 24 is a part, to turn in the nuts 29 and 30 without disturbing the spindle 28. Formed on the abutment 22 is a shoulder which supports one end of the coiled spring 23, its opposite end being supported by a shoulder on the fixed abutment 31. The abutment 31 is internally threaded and mounted on the sleeve 32. The sleeve is mounted in the cover 12, and held in position by a flange 33 on one side, and a nut 34 on the other.

The sleeve 32 is fastened in the cover 12 after the spring 23 has been set for the initial speed. The outer extremity of the sleeve 32 is hexigonal in form, and is adapted to receive a wrench for turning it whereby the abutment 31 can be moved axially in either direction according to the direction or rotation of the said sleeve 32 to adjust the tension of the spring. To prevent the fixed abutment 31 from turning with the sleeve 32, slots are cut therein which are adapted to receive the pins 37 and 38 which are rigidly secured to the cover 12. It is obvious that as the sleeve 32 is turned by a wrench the abutment 31 is free to move axially but is prevented from rotating by means of the pins 37 and 38 above mentioned. Drilled in the outer extremity of the sleeve 32 is a hole adapted to receive the spindle 28 and serve as a guide therefor in its axial movement, and also as a bearing for its rotary movement. Formed on the spindle 28 is a collar 39 which serves as a stop for the said spindle and depending members, and limits the movement of the spring.

Formed on the outer extremity of the spindle 28 is a ball which rotates in a suitable bearing formed partly in a nut 40, and partly in the hollow nut 41, said arrangement forming a universal joint. The bearing is carried by a bell crank 7 which actuates the throttle valve 3.

The nut 41 is provided with a head for turning it. After the governor is set, the nut is locked in position by means of the lock nut 42. After the spring is set for an initial speed the adjusting device, consisting of the nuts 40 and 41, will provide a range of adjustment for adjusting the valve within the range of the spring. If the initial speed is 1000 revolutions per minute and the spring is adjusted for that speed, and the range of variation of the spring is from 1000 to 2000 revolutions per minute, the adjusting device located in the bell crank 7 will adjust the valve 3 to any speed regulation within the range of the spring. When the machine is running the variation in speed imparts movement to the bell crank 7 which in turn regulates the flow of elastic fluid passing through the valve 3 to the turbine rotor. The nuts 40 and 41 serve as a bearing for the spindle 28 at one extremity, and as they are stationary in relation to the bell crank 7 it provides a simple means for adjusting the governing valve while the machine is running.

To obtain a proper and successive amount of travel of each convolution of the spring, a spacing spring 45, made of any suitable material and preferably of relatively soft metal, is placed between said convolutions, and when one of them is deflected it travels until the spacing member acts against the next convolution to which the movement is communicated, and so on, with each convolution in turn.

A conical spring having convolutions of varying size is especially desirable owing to the fact that it is easy to determine the range of variable deflections of the convolutions of the spring by finding the stress necessary to deflect the end convolutions. This determines the minimum and maximum pressures necessary to deflect the spring for maximum and minimum regulation. The intermediate convolutions will necessarily be gradually proportioned in relation to the two end convolutions, thereby rendering a gradual regulation by adjustment according to the regulation required to control the speed of the machine.

Springs having convolutions of varying diameter and cross section are preferably made from a solid block of steel, the outside surface of which is cut on a taper and the inside drilled or bored to any desirable outline. The block is placed in a lathe and the convolutions formed on a helical curve by means of a tool operated by the thread cutting apparatus. The space between the convolutions of the spring are wider than is necessary owing to the fact that the tool used in forming them has to be a heavy one in order to cut away the metal.

In carrying out the invention, I have shown an elastic fluid turbine having a valve 3 which admits fluid to the turbine wheel through a suitable passage which is controlled by the speed responsive device 6. When the shaft 5 revolves it carries with it the base 9, cover 12, weights 18 and 19 and also the spring 23 and spindle 28. The rotation of the shaft causes the weights 18 and 19 to be moved outwardly by centrifugal force against the spring 23 which imparts an axial movement to the spindle 28, bell crank 7 and valve 3, thereby controlling the elastic fluid which passes to the turbine wheel. When the spring is adjusted initially, the nut 34 is rotated sufficiently to permit the sleeve 32 to turn which will impart an axial movement to the movable abutment 31. By this means the spring 23 is set for the initial speed which may for example be 1000 revolutions per minute. The abutment 31 and the sleeve 32 are then locked rigidly to the cover 12. The maximum speed of the machine may for example be 2000 revolutions per minute and intermediate speeds can be obtained by moving the devices 40 and 41 back and forth which impart movement to the bell crank lever 7 to change the relation of the valve 3 to its seat.

The spring can be designed to operate within a range of two to one, and can be made any size according to the demands of the machine.

Assuming the travel of the weights is divided into ten parts the whole being equal to 100% and each one of the divisions equal 10%, the spring is designed to be adjusted for each division and also to impart sufficient travel to close the valve at each division.

In accordance with the provisions of the patent statutes, I have described the principle of operation of my invention, together with the apparatus which I now consider to represent the best embodiment thereof; but I desire to have it understood that the apparatus shown is only illustrative, and that the invention can be carried out by other means.

What I claim as new and desire to secure by Letters Patent of the United States is:

1. A speed governor having weights movable in response to change in speed, a shaft for driving the weights, a spring opposing the outward movement of the weights, which is composed of a coil having a number of convolutions, each convolution differing from the other both in cross sectional area and stiffness, and a means actuated by the joint action of the spring and the weights.

2. A speed governor having weights movable in response to change in speed, a shaft for driving the weights, a graduated spring for opposing the outward movement of the weights which is composed of a coil having a number of graduated convolutions, each convolution differing from the other as to stiffness, and a means actuated by the spring and weights.

3. A speed governor having weights movable in response to change in speed, a shaft for driving the weights, a spring for opposing the outward movement of the weights which is composed of a coil having a number of convolutions, each convolution differing from the other both in cross sectional area and in stiffness, a movable abutment acted upon by the spring, and means moved by the abutment.

4. A speed governor having weights movable in response to change in speed, a shaft for driving the weights, a spring for opposing the outward movement of the weights which is composed of a coil having a number of convolutions, each convolution differing from the other both in cross sectional area and in stiffness, a movable abutment acted upon by the spring, means moved by the abutment, an adjustable abutment for the spring, and means coöperating therewith for setting the spring initially.

5. A speed governor having weights movable in response to change in speed, a shaft for driving the weights, a spring opposing the outward movement of the weights which is composed of a coil having a number of convolutions, each convolution differing from the other both in cross sectional area and in stiffness, means actuated by the spring and weights, and means located between the convolutions of the spring for determining the deflection thereof.

6. A speed governor having weights movable in response to change in speed, a shaft for driving the weights, a spring opposing the outward movement of the weights which is composed of a coil having a number of convolutions, each convolution differing from the other, both in cross sectional area and in stiffness, means actuated by the spring and weights, a secondary spring located between the convolutions of the governing spring for determining the deflection thereof.

7. A speed governor having weights movable in response to change in speed, a shaft for driving the weights, a spring for opposing the outward movement of the weights which is composed of a coil having a number of convolutions, each convolution differing from the other both in cross sectional area and in stiffness, a movable abutment acted upon by the spring, means moved by the abutment, and means located between the convolutions of the spring for determining the amount of deflection thereof.

8. A speed governor having weights movable in response to change in speed, a shaft for driving the weights, a spring for opposing the outward movement of the weights which is composed of a coil having a number of convolutions, each convolution differing from the other both in cross sectional area and in stiffness, a movable abutment acted upon by the spring, means moved by the abutment, means coöperating with the abutment for setting the spring, and means located between the convolutions of the spring for determining the deflection thereof.

In witness whereof, I have hereunto set my hand this 26 day of March, 1913.

FRED E. NORTON.

Witnesses:
ALEX. F. MACDONALD,
JOHN A. McMANUS, Jr.